(12) United States Patent
Dickins et al.

(10) Patent No.: US 9,094,523 B2
(45) Date of Patent: Jul. 28, 2015

(54) METRIC FOR MEETING COMMENCEMENT IN A VOICE CONFERENCING SYSTEM

(71) Applicant: DOLBY LABORATORIES LICENSING CORPORATION, San Francisco, CA (US)

(72) Inventors: Glenn N. Dickins, Como (AU); Michael Eckert, Ashfield (AU); Jean-Francois Catz, Eguilles (FR)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/406,888

(22) PCT Filed: Jun. 19, 2013

(86) PCT No.: PCT/US2013/046653
§ 371 (c)(1),
(2) Date: Dec. 10, 2014

(87) PCT Pub. No.: WO2014/004224
PCT Pub. Date: Jan. 3, 2014

(65) Prior Publication Data
US 2015/0163362 A1    Jun. 11, 2015

Related U.S. Application Data

(60) Provisional application No. 61/665,429, filed on Jun. 28, 2012.

(51) Int. Cl.
*H04M 3/42*    (2006.01)
*H04M 1/64*    (2006.01)
*H04M 3/56*    (2006.01)

(52) U.S. Cl.
CPC ............. *H04M 3/563* (2013.01); *H04M 3/568* (2013.01)

(58) Field of Classification Search
CPC . H04M 2201/41; H04M 3/4936; H04M 3/56; H04M 3/568
USPC ................ 379/202.01, 88.02, 88.01, 203.01, 379/204.01, 201.01; 455/416
See application file for complete search history.

(56) References Cited

U.S. PATENT DOCUMENTS 7,403,487 B1    7/2008    Foladare
7,653,719 B1    1/2010    Jeong
(Continued)

OTHER PUBLICATIONS

Han, Q. et al "Issues of Audio Quality for Video Conferencing" Proc. SPIE Multimedia Systems and Applications, Jan. 22, 1999, vol. 3528.
(Continued)

*Primary Examiner* — Thjuan K Addy (57) ABSTRACT

A method (400) for determining that an audio conference is in a first phase of a plurality of phases. The method comprises determining (401) a plurality of sequences (301) of events (305) for a plurality of terminals (120, 170); wherein an event from the sequences (301) of events (305) indicates that a talker activity at a terminal (120, 170) has been detected; determining (403) a sequence (350) of feature vectors (330) based on the plurality of sequences (301) of events (305); wherein a feature vector (330) of the sequence (350) of feature vectors (330) is indicative of the talker activity (332) of at least one of the plurality of terminals (120, 170) relative to the talker activity at least another one of the plurality of terminals (120, 170); and determining (406) that the audio conference is in the first phase based on the sequence (350) of feature vectors (330). DETAILS: audio-conference phases identified as: I) introductory phase (comprising a waiting phase, an uncoordinated activity or chatting phase, and a participant introductions/attendance check phase); II) cooperative phase (comprising productive discussions between participants); III) sign-off phase. In addition to participant join/leave/mute events, voice-activity detection algorithms are used for measuring a ratio of voice-activity of each participant (RTT, Relative Talking Time) and other features (CTT, Concurrent Talking Time, NT, number of Turns, NAE, Number of Active Endpoints) and for inferring the current phase of the conference; conference logs or recordings may be used instead of real-time measurements; the time difference (delay) between scheduled time or first call and the reach of phase II is used as a measure of efficiency of the conference.

20 Claims, 6 Drawing Sheets

(56) References Cited

U.S. PATENT DOCUMENTS

| | | | |
|---|---|---|---|
| 8,130,915 B2* | 3/2012 | Jaiswal et al. | 379/88.02 |
| 2007/0067159 A1 | 3/2007 | Basu | |
| 2008/0189724 A1 | 8/2008 | Tien | |
| 2008/0239972 A1 | 10/2008 | Omar | |
| 2009/0201824 A1 | 8/2009 | Leung | |
| 2009/0225670 A1 | 9/2009 | Leung | |
| 2009/0237240 A1 | 9/2009 | Leung | |
| 2010/0034367 A1 | 2/2010 | Das | |
| 2011/0191109 A1 | 8/2011 | Harma | |

OTHER PUBLICATIONS

ITU-T G.114 "One-Way Transmission Time" May 2003.
ITU-T G.1050 "Network Model for Evaluating Multimedia Transmission Performance Over Internet Protocol" Mar. 2011, Series G: Transmission Systems and Media, Digital Systems and Networks, Multimedia Quality of Service and Performance—Generic and User-Related Aspects.
ITU-T P.863, ITU-T Recommendation P.863 "Perceptual Objective Listening Quality Assessment" Series P: Terminals and Subjective and Objective Assessment Methods, Methods for Objective and Subjective Assessment of Speech Quality, Jan. 2011.
Perry, Avi "Fundamentals of Voice-Quality Engineering in Wireless Networks" Cambridge University Press, published on Dec. 25, 2006.
Wei, P. et al. "Modeling Dynamical Influence in Human Interaction: Using Data to Make Better Inferences about Influence within Social Systems" IEEE Signal Processing Magazine, vol. 29, Issue 2, pp. 77-86, Mar. 2012.
Zhang, H. et al "Minimizing Delay for Video Conference with Network Coding" Journal International Journal of Information and Coding Theory, vol. 2, published on Jan. 1, 2011.
Krueger, G.P. "Conferencing and Teleconferencing in Three Communication Modes as a Function of the Number of Conferees" INSPEC, pp. 115p. Published in Feb. 1977.
Fu, T.Z.J. et al "Performance Metrics and Configuration Strategies for Group Network Communication" IEEE International Workshop on Quality of Service, vol. 5448, pp. 173-81, Jun. 21-22, 2007.
Ramachandran, K. et al "Supporting Enterprise-Grade Audio Conferencing on the Internet" 10th International Conference on Passive and Active Network Measurement, vol. 5448, pp. 143-152, published in 2009.
Aoki, P.M. et al "The Mad Hatter's Cocktail Party: A Social Mobile Audio Space Supporting Multiple Simultaneous Conversations", Conference Proceedings, Conference on Human Factors in Computing Systems, Apr. 5-10, 2003, pp. 425-432.
Aki H. et al. "Conversation Detection in Ambient Telephony" IEEE International Conference on Acoustics, Speech and Signal Processing, Apr. 19, 2009, pp. 4641-4644.
ITU-T G 160, "Voice Enhancement Devices" Series G: Transmission Systems and Media, Digital Systems and Networks, International Telephone Connections and Circuits-Apparatus Associated with Long-Distance Telephone Circuits, Jun. 2012.
ITU-T G 167, "Acoustic Echo Controllers" General Characteristics of International Telephone Connections and International Telephone Circuits, Mar. 1993.

* cited by examiner

METRIC FOR MEETING COMMENCEMENT IN A VOICE CONFERENCING SYSTEM

CROSS-REFERENCE TO RELATED APPLICATIONS

This application claims priority to U.S. Provisional Patent Application No. 61/665,429 filed 28 Jun. 2012, which is hereby incorporated by reference in its entirety.

TECHNICAL FIELD

The present document relates to conferencing systems. In particular, the present document relates to a method and system for reliably determining parameters indicative of the efficiency of a voice conference.

BACKGROUND

In the area of 'voice conferencing' the ability to measure and manage the user experience across a large user base is an important capability requirement for service providers. An important cost in a subscription or service based voice conferencing system is the loss of a customer due to their experience not meeting general or competitive expectations. Whilst in some cases, such user dissent may be voiced to an operator of the provider of the voice conference service, quite often the first signs can be the loss of customers and accounts which can have a significant impact on the business success of the provider of the voice conference service.

To this end, there is an interest around the online and automated assessment of telecommunications systems performance. Some areas of system performance and quality assessment are the assessment of voice quality, the assessment of system audio latencies, the assessment of network performance, the processing for echo and noise abatement (e.g. G.160 or G.167), and the assessment of call stability.

There may be other higher level measures of performance for a communications system that may not map to any one of the above mentioned singular technical quality measures. Such higher level measures become increasingly important as the complexity of terminals, the number of parties present, and the diversity of use cases increases for typical voice conferencing systems. In the present document, such a higher level measure is described, which is of significant impact and inherent value to the quality of a voice conference. In the present document, means for objectively and automatically monitoring such a higher level measure are described.

Technology can provide an alternative to parties of a meeting being physically present in order to commence and conduct a meeting. However, such technology can also create an obstacle and distraction in achieving a quorum and commencing a meeting. In addition to general lateness and attendance issues, a voice conferencing system can create a barrier and delay for a meeting as people may need to install, locate, load, configure, test and establish correct operation of devices that are not always primarily dedicated to the purpose of voice conferencing. Without a doubt, and from countless examples and anecdotal evidence, such delay in commencing a meeting is common and can be attributed and associated with new technologies.

In considering the cost of such inefficiency, the event of a meeting brings together a set of people, all of whom may have a role to play in the organization. The lost time caused by a delayed meeting commencement is therefore multiplied by the number of people attempting to meet. This inefficiency aspect is further underlined by the fact that the delays are often longer for larger groups trying to co-ordinate via technological means. In view of this, the present document describes a measure which allows to reliably and automatically measure and/or track such delays incurred for the commencement of voice conferences. In particular, the present document describes a framework and technique for determining the amount of time elapsed from the first attempt or scheduled point of a meeting, until the activity and dynamic of the voice conference represents a functional meeting behavior. As will be outlined in the present document, the measurement of the delay in the commencement of the voice conference can be achieved by data logging, analysis, pattern matching and/or heuristics (as well as a combination thereof) to provide a reliable metric for meeting commencement.

The value of a reliable and automatic measure for determining the delay of commencement of a voice conference lies e.g. in tracking and improving (i.e. reducing) such delay. The reduction of the delay may be achieved e.g. through technological means (improvements of the voice conference system) and through social conditioning means (corporate norms for meeting promptitude, etc.). In particular, the estimated delay of commencement of a voice conference may be used to adjust the settings of an audio conference system (e.g. the talker positions of a 2D or 3D conference scene), in order to reduce the delay of commencement. When incorporated into a corporate conferencing system, the metric described in the present document may be a useful measure of meeting effectiveness and user experience.

SUMMARY

According to an aspect a method for determining that an audio conference which makes use of an audio conference system is in a first phase of a plurality of pre-determined phases is described. The audio conference system may be configured to link a plurality of M terminals, with M>2 (e.g. M>3, 4, 5, 6), for the participants of the audio conference. The audio conference system may make use of a centralized architecture (comprising a central conference server) and/or of a de-centralized architecture. The audio conference system may be configured to place the terminals into a 2 dimensional (2D) or 3 dimensional (3D) conference scene (e.g. using binauralization techniques).

An audio conference typically comprises a plurality of different phases. By way of example, the plurality of phases of the audio conference may comprise any one or more of a waiting phase of the audio conference (where the participants of the audio conference wait for a further participant to join the audio conference); a phase of uncoordinated activity within the audio conference (where the participants of the audio conference chat with each other, without being focused on the purpose of the audio conference); a phase of participant introductions and attendance checks within the audio conference (where the participants briefly indicate their presence and name); a phase of productive activity within the audio conference (where the participants of the audio conference focus on the purpose of the audio conference); and a sign off phase of the audio conference (wherein the participants say goodbye and leave the audio conference). The above mentioned phases may be aggregated to a plurality of aggregated phases of the audio conference, such as a cooperative phase of the audio conference (which typically comprises a relatively high degree of phases of productive activity); and an introductory phase of the audio conference (which typically comprises a waiting phase, a phase of uncoordinated activity and/or a phase of participant introductions and attendance check).

The method described in the present document may be directed at determining that the audio conference is (at a particular point in time) within a first phase of the above mentioned plurality of phases (e.g. within the cooperative phase of the audio conference). For this purpose, the method may comprise determining a plurality of sequences of events for the plurality of terminals of the audio conference system, respectively. An event may be determined on a time grid having a grid interval referred to as an event time interval. An event may describe the presence of a pre-determined situation at a corresponding terminal within the corresponding event time interval. In particular, an event from the sequences of events may indicate that a talker activity at a terminal has been detected within an event time interval. This type of event may be referred to as a T event (T for "Talker activity"). Detecting the talker activity (i.e. detecting the T event) within a first event time interval may comprise determining an energy of an upstream audio signal generated by the terminal within the first event time interval. Furthermore, it may be determined that the energy within the first event time interval is greater than a pre-determined first energy threshold, thereby detecting the presence of the T event. Alternatively or in addition, detecting the T event may comprise Voice Activity Detection, in order to distinguish between actual talker activity and noise within the upstream audio signal originating from a terminal.

As such, the method may comprise detecting respective sequences of events for the plurality of terminals of the audio conference system. The respective sequences of events may indicate the presence or absence of T events at a corresponding sequence of event time intervals. In other words, the sequences of events may indicate the terminals which exhibit talker activity within selected event time intervals of the sequence of event time intervals (and those the exhibit no talker activity).

The method may further comprise determining a sequence of feature vectors based on the plurality of sequences of events. A feature vector typically provides a pattern of the audio conference over a feature time interval, wherein the feature time interval typically comprises a plurality of event time interval. In particular, the feature vector may describe selected statistical properties of the audio conference within the corresponding feature time interval. Even more particularly, a feature vector of the sequence of feature vectors may be indicative of the (amount of) talker activity at at least one of the plurality of terminals relative to the (amount of) talker activity at at least another one of the plurality of terminals within the corresponding feature time interval. By way of example, the feature vector within a first feature time interval may be indicative of the relative (amount of) talker activity at a selected terminal within the first feature time interval relative to the total (amount of) talker activity within the first feature time interval.

Furthermore, the method may comprise determining that the audio conference is in the first phase based on the sequence of feature vectors. In other words, the method may use the sequence of feature vectors (describing a sequence of statistical patterns of the audio conference for a sequence of corresponding feature time intervals) to determine a current phase of the audio conference at a particular time instant.

The above mentioned step of determining a sequence of events for a first terminal may comprise analyzing logging data logged at or logged for the first terminal during the audio conference. By way of example, the logging data may be logged at the central conference server of the audio conference system. The logging data may comprise any one or more of: an identifier for the audio conference; an upstream audio signal generated by the terminal during the audio conference using a microphone; terminal control information (e.g. for joining the audio conference, for leaving the audio conference, and/or for putting the terminal on mute) generated at the terminal during the audio conference; and time stamp data allowing to align the logging data received from the first terminal with the logging data received for the other terminals of the plurality of terminals.

An (e.g. any) event from the plurality of sequences of events may be selected from any one or more of the following events (for a particular terminal and within a particular event time instant): the T event, wherein the T event may be indicative of the talker activity at the particular terminal within the particular event time interval; an M event indicative of the particular terminal being in mute within the particular event time interval; a J event indicative of the particular terminal dialing into the audio conference within the particular event time interval; and an L event indicative of the particular terminal terminating the audio conference within the particular event time interval.

Determining a feature vector for a particular first feature time interval comprising a plurality of first event time intervals may comprise determining the number of T events comprised within the first feature time interval, for each of the plurality of terminals; and/or determining a ratio of the number of T events for a particular first terminal of the plurality of terminals and the total number of T events for all terminals of the plurality of terminals.

A (e.g. any) feature vector of the sequence of feature vectors may be indicative of the (amount of) talker activity at N of the plurality of terminals relative to the (amount of) talker activity at all of the plurality of terminals within the corresponding feature time interval, N>0; N smaller than or equal to M. As such, the feature vector may comprise N dimensions, each dimension indicative of the relative (amount of) talker activity of a different one of the plurality of terminals. The selected N terminals may be the terminals having the highest relative (amount of) talker activity within the corresponding feature time interval.

Alternatively or in addition, a (e.g. any) feature vector of the sequence of feature vectors may be indicative of a concurrent talker activity up to K terminals, respectively, within the corresponding feature time interval, K>=0 and K smaller than or equal to M, e.g. K>=2. The concurrent talker activity of k terminals, e.g. k=0, . . . , K, may be determined based on a number of event time intervals within the feature time interval for which (exactly) k terminals have concurrent T events. In other words, it may be determined (e.g. expressed as a percentage of the length of the feature time interval) how much time (exactly) k terminals exhibit concurrent talker activity.

Alternatively or in addition, a (e.g. any) feature vector of the sequence of feature vectors may be indicative of a number of hand overs of talker activity between different terminals within the feature time interval. In other words, the feature vector may be indicative of the extent of turn taking within the particular feature time interval.

Alternatively or in addition, a (e.g. any) feature vector of the sequence of feature vectors may be indicative of a number L of different terminals comprising at least one T event within the feature time interval, L being equal to or smaller than M. In other words, the feature vector may be indicative of how many of the M terminals have actively participated in the audio conference within a particular feature time interval.

Determining a sequence of feature vectors may comprise selecting a first feature time interval for determining a first feature vector of the sequence of feature vectors; and selecting a second feature time interval for determining a second feature vector of the sequence of feature vectors. The first and second feature vectors may be determined based on the excerpts of the sequences of events lying within the first and second feature time intervals, respectively. The second feature vector may directly succeed the first feature vector in the sequence of feature vectors. Furthermore, the first and second time intervals may overlap. By way of example, the time offset between the first and second feature time intervals may lie within a range of 500 ms or 30 seconds to 1 minute; wherein the feature time interval may lie within a range from 1 minute to 5 minutes (and/or wherein the event time interval may lie within a range from 20 ms to 1 second, e.g. the event time interval may correspond to the size of an audio frame). As such, the statistical patterns of the feature vectors may be determined based on relatively long feature time intervals (thereby allowing for reliable statistical analysis), whereas the time offset between adjacent feature vectors may be relatively short (thereby allowing for a relatively high time resolution for determining the phase of the audio conference).

The method may comprise time aligning the plurality of sequences of events for the plurality of terminals. As such, it may be ensured that the detected events for a first terminal are time aligned with the detected events of the other terminals. In other words, it can be ensured that events which occurred at different terminals within corresponding event time intervals within the sequence of event time intervals actually occurred at the same time instant (or within the same time interval).

The sequence of feature vectors may be used to determine the phase of the audio conference at a particular time instant (or to determine the evolution of the phases of the audio conference along the time line). This may be achieved by using pattern recognition techniques which assign a feature vector and/or a subsequence of feature vectors (i.e. patterns) to a phase of the audio conference. In an example, the method comprises assigning a feature vector of the sequence of feature vectors to one of a plurality of pre-determined classifications. A classification of the plurality of classifications may be indicative of a corresponding type of activity within the audio conference or of a corresponding phase of the audio conference. The plurality of pre-determined classifications may comprise any one or more of: a W classification, indicative of a waiting phase of the audio conference; a B classification, indicative of a phase of uncoordinated activity within the audio conference; an I classification, indicative of a phase of participant introductions and attendance check within the audio conference; a C classification, indicative of a phase of productive activity within the audio conference; and
an S classification, indicative of a sign off phase of the audio conference.

As such, the above mentioned phases may be determined on a time granularity which corresponds to the time offset between adjacent feature time intervals. A cooperative phase of the audio conference may extend across a plurality of feature time intervals, i.e. the cooperative phase of the audio conference may comprise a plurality of the above mentioned phases. In particular, the cooperative phase of the audio conference may comprise a density of phases of productive activity exceeding a pre-determined density threshold.

A (e.g. any) feature vector of the sequence of feature vectors may be assigned to a classification using a classifier. The classifier may have been trained using annotated training data of training feature vectors and training classifications. In other words, the classifier may have been obtained based on annotated training data. The training data comprises different training feature vectors for the plurality of pre-determined phases which are typical for a respective one of the plurality of pre-determined phases. As such, a clustering algorithm of the classifier may be built, which determines clusters of feature vectors which are to be assigned to a respective one of the plurality of pre-determined phases (i.e. to a respective one of the plurality of pre-determined classifications).

The method may further comprise determining a sequence of classifications from the sequence of feature vectors (e.g. based on a one-to-one assignment of a feature vector to a classification or based on a many-to-one assignment of a subsequence of feature vectors to a classification). Furthermore, the method may comprise identifying a segment within the sequence of classifications having a density of C classifications higher than a density threshold. Such a segment may be indicative of a cooperative phase of the audio conference. A segment typically comprises a pre-determined number of succeeding classifications from the sequence of classifications.

Alternatively or in addition to determining the first phase of the audio conference, the method may be directed at determining an estimate of a commencement time instant of the audio conference. The estimate of the commencement time instant may be determined based on the sequence of feature vectors, in particular based on the identified segment. The commencement time instant may be indicative of a beginning of the cooperative phase of the audio conference. In particular, the commencement time instant may be indicative of a transition from an introductory phase to the cooperative phase of the audio conference. The estimate of the commencement time instant may be indicated relative to a scheduled start time of the audio conference; relative to a time instant indicative of one of the plurality of terminals joining the audio conference; and/or relative to a regional time corresponding to a full hour, a quarter to the full hour, half past the full hour or a quarter to the full hour.

As indicated above, the audio conference system may be configured to place the plurality of terminals at different talker locations within a 2D or 3D conference scene. The method may comprise selecting the different talker locations based on the estimate of the commencement time instant. In more general terms, one or more settings of the audio conference system may be selected based on the estimate of the commencement time instant.

It should be noted that all the events of the sequences of events may share a common time grid with a grid spacing corresponding to the event time interval. In a similar manner, all feature vectors of the sequence of feature vectors may cover the same temporal length corresponding to the feature time interval.

According to a further aspect, an analysis server configured to estimate a commencement time instant of an audio conference which is performed within an audio conference system is described. The audio conference system may link a plurality of M terminals, M>2 (e.g. M>3, 4, 5, 6), the terminals being for participants of the audio conference. The commencement time instant may be indicative of a beginning of a cooperative phase of the audio conference. The analysis server may be configured to receive logging data related to the plurality of terminals. Furthermore, the analysis server may be configured to determine a plurality of sequences of events for the plurality of terminals of the audio conference system, respectively, based on the logging data. An (e.g. any) event from the sequences of events may indicate whether or not a talker activity at a terminal has been detected within a corresponding event time interval.

It should be noted that the logging data related to the plurality of terminals may comprise the logging data of a complete audio conference (i.e. from a beginning of the audio conference up to the end of the audio conference). The logging data may be received and/or analyzed after the end of the audio conference. Consequently, the analysis server may make use of logging data covering the entire audio conference (and not only the logging data up to the point at which commencement is inferred). This means that the commencement time instant may be determined based on the analysis of the complete audio conference. By way of example, the commencement time instant may be determined by analyzing the audio conference starting from the end of the audio conference backward. In particular, a segment of classifications may be determined, for which a density of C classifications falls below a (second) density threshold. The temporal end of such a segment may be indicative of the commencement time instant.

Furthermore, the analysis server may be configured to determine a sequence of feature vectors based on the plurality of sequences of events. A (e.g. any) feature vector of the sequence of feature vectors may be indicative of the (amount of) talker activity at at least one of the plurality of terminals relative to the (amount of) talker activity at at least another one of the plurality of terminals within a corresponding feature time interval. Typically, the feature time interval comprises a plurality of event time intervals. In addition the analysis server may be configured to determine the estimate of the commencement time instant based on the sequence of feature vectors.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

The invention is explained below in an exemplary manner with reference to the accompanying drawings, wherein.

DETAILED DESCRIPTION

As outlined in the introductory section, voice conferences may be subject to significant delays for commencing the voice conferences. In particular, with small to medium sized conferences, there may be a challenge of getting the quorum assembled and of being able to use the conferencing system. The present document addresses the technical problem of measuring in an automatic manner the moment of time at which the participants of a voice conference effectively start a constructive voice conference, thereby allowing to track the time period between the intended start of a voice conference and the commencement of a productive voice conference. In this context, a distinct change in the pattern and dynamics of a multi party voice conference may be used to determine a time instant indicative of when a meeting actually started in a productive way. This metric is useful for indicating both the efficiency of the people and the conferencing system in use. Of particular interest may be to use such measure in order to demonstrate an improvement in conference commencement related to a particular hardware, software, system or deployment design of the voice conferencing system. In other words, a measure which tracks a time instant at which a voice conference switches from an (unproductive) preparatory phase to a productive working phase may be used to adjust parameters of a voice conferencing system, in order to shorten—in average—the (unproductive) preparatory phase of voice conferences.

The metric described in the present document may identify the time instant at which things move from a social and/or casual engagement to the point where attention is required or appropriate to the purpose of the meeting (especially for those directly involved). The present document provides means of deriving an approximation of this time instant from raw data that can be collected from the voice conference system.

By way of example, the following raw data (also referred to as logging data) may be recorded and utilized for determining the time instant at which a voice conference switches from an (unproductive) unstructured mode to a (productive) structured mode:

a) the time instants of connections and/or disconnections for some or all of the terminals or users of the voice conference;

b) the voice activity at some or all of the terminals, preferably time aligned across the entire voice conference;

c) the different types of terminals (e.g. softclient on a computer, fixed telephone, mobile telephone, VoIP client, etc.);

d) software re-installation, system reboot, and/or audio hardware changes that may have occurred during the voice conference at particular terminals;

e) instantiation and operation of other resources such as video, screen sharing, display of powerpoint presentation, etc.;

f) the noise, voice and nuisance levels at some or all of the terminals; and/or g) mute activity of some or all of the terminals during the voice conference.

In particular, the items a) and/or b) may be used to reliably determine the time instant at which a voice conference becomes structured/productive (referred to herein as the commencement time instant). The other items may be used alternatively or in addition, e.g. for refinement and accuracy of estimating the commencement time instant.

Table 1 provides a list of important causes of a delayed commencement.

TABLE 1

| Cause | Observable Behaviour |
| --- | --- |
| Delayed attendance of some participants | The conference dynamics change upon entry of a new participant and persists in a new dynamic subsequent to a party joining the conference; the party joining typically demonstrates at least some speech interaction upon joining and inferred relevance to the meeting. |
| Connection or system problems for some participants | The conference dynamic changes and persists in a new dynamic state for some time after one or more participants disconnect and then reconnect (or change hardware); the reconnecting participant typically engages delivery or interaction with other participants after connecting or altering the hardware. |
| Lack of organization | More sporadic and simultaneous end point activity; no transactional dynamics. |
| Co-ordination of additional resources | All parties are online in the conference, and short query conversations as different services are started for sharing or for consumption on certain endpoints. An example is the time for parties to accept screen sharing or achieve access to a resource such as a stored or online document. After this state, the indicative normal conference dynamics will generally appear. |
| Attendee in wrong meeting | An attendee disconnects, joins another meeting and then becomes active and possibly important in the other conference. |

There may be a general rule that the last one of such events which occurs within a reasonable time period of the scheduled or rounded meeting commencement time (e.g. 10-15 minutes after the first participant joins) may represent the effective meeting commencement time instant.

As such, a set of rules (such as the rules listed in Table 1) may be provided, wherein the set of rules may provide a relationship between the observed dynamics of the voice conference and one or more reasons that may be the cause for the observed dynamics. As outlined in this document, the observed dynamics of the voice conference may be described e.g. by a classification or a sequence of classifications (for further details see the description in relation to FIGS. 3a to 3f). Hence, the set of rules may be used to determine one or more reasons for a determined commencement time instant. In other words, the set of rules may provide indications of one or more causes of the delayed commencement of a voice conference. Furthermore, the sequence of classifications (describing the evolution of the dynamics of the voice conference) may be used to determine an estimate of the commencement time instant.

By way of example, the dynamic of a structured voice conference may involve a paced turn taking (e.g. a change over of the active speaker), possibly one or more interruptions, and/or one or more occasional pauses. It is observed that the turnover time and average length of sequential speech activity from at least some endpoints is longer once the meeting has commenced. In other words, it is observed that the dynamic of a structured voice conference typically exhibits unevenly distributed speech activity from different endpoints.

On the other hand, a dynamic of a voice conference which is in its setup phase, prior to the commencement time instant, may comprise the indicative behavior of multiple active endpoints, idle chatter at different connected endpoints, and/or endpoints which are muted whilst there is significant local voice activity at the muted endpoint. Such local voice activity may be observed by the endpoint and may be reported to a central server which is configured to determine the commencement time instant from data collected from the voice conference server and/or from the different endpoints.

Example patterns (or dynamics) that may characterize the commencement of a voice conference comprise:

a) introductions—typically a short segment of voice activity of similar length originating sequentially from the endpoints which are connected;
b) agenda and comment—typically a long discourse from one endpoint with little interruption;
c) structured turn taking; and/or
d) no more people/endpoints joining the voice conference.

It should be noted that the late joining and/or the interruption of an endpoint/participant does not necessarily imply that the commencement time instant has not yet been occurred. If—over subsequent data from the conference—it is observed that this particular endpoint/participant does not participate significantly in the voice conference, then it is likely that the meeting had already commenced before the engagement of that particular endpoint/participant. On the other hand, if the person is very active after commencing, then this relatively high degree of speech activity increases the likelihood that the meeting was in a waiting state before the arrival of the particular endpoint/participant. As such, the subsequent speech activity of a joining party may be taken into account when determining the commencement time instant.

The systems and method described in the present document may be configured to provide a measure of confidence of the determined estimate of the commencement time instant, in addition to the estimate of the commencement time instant. For example, such a measure of confidence may be based on the relative ratio of the classification of features as conference related before and after the identified transition. Another aspect of determining a measure of confidence is the extent to which the identified productive segment occupies a large and central section of the total conference time. Such measure of confidence may be combined with other aspects related to aberrant duration, user connection patterns, gaps and silences across the conference and may be used to filter or select particular voice conferences for data analysis, in order to avoid corrupted results. In other words, the measure of confidence and other properties of activity across the entire conference may be used to exclude unreliable or inappropriate estimates of commencement time instants from aggregate data analysis.

It should be noted that the determination of an estimate of the commencement time instant may be performed after the voice conference has been completed (based on data gathered from the conference server and/or from the endpoints). In other words, the estimate of the commencement time instant may be determined based on the post-processing of data logged during the voice conference. In this way, the analysis can segment a voice conference into different time periods such as "join", "wait", "commence", "wrap up" and "end". It should also be noted that the collected data from various voice conferences can be used for building a classifier used for determining the estimate of the commencement time instant.

The metric indicating the commencement time instant may be referenced to a start time of the voice conference that may be available from a calendar or an integrated meeting planning system (for example virtual conference room booking times). Alternatively or in addition, the metric for the commencement time instant may be related to the time at which the first person joins the voice conference. Alternatively, the metric for the commencement time instant may be referenced to the time of the first person to join, rounded to the nearest typical meeting commencement target (e.g. full hour, quarter past, half past or quarter to a full hour).

Figure 1A:
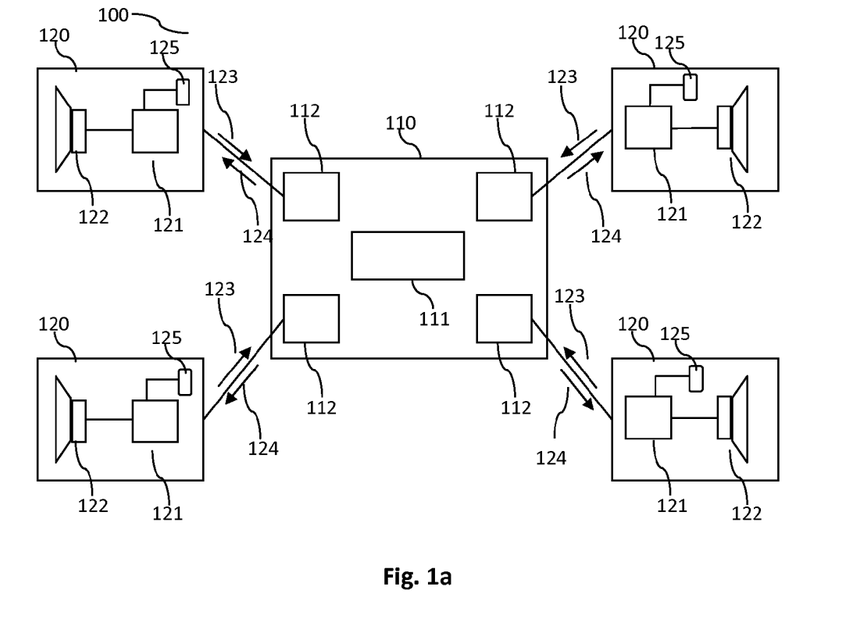
FIG. 1a shows a block diagram of an example centralized audio conference system.

FIG. 1a illustrates an example multi-party audio conference system 100 with a centralized architecture. A centralized conference server 110 receives a plurality of upstream audio signals 123 from a respective plurality of terminals 120 (also referred to as endpoints 120 in the present document). The terminals 120 comprise respective transceivers 125 (e.g. microphones) to convert acoustic signals at the terminals 120 into respective upstream audio signals 123. An upstream audio signal 123 is typically transmitted as an audio stream, e.g. a bitstream. By way of example, an upstream audio signal 123 may be encoded as a G.711, a G722.2 (AMR-WB), a MPEG2 or a MPEG 4 audio bitstream. Typically, the upstream audio signal 123 is a mono audio signal. The centralized conference server 110 (e.g. the audio servers 112 comprised within the conference server 110) may be configured to decode the upstream audio streams (representing the upstream audio signals 123) and to extract optional metadata associated with upstream audio streams.

The conference server 110 may e.g. be an application server of an audio conference service provider within a telecommunication network. The terminals 120 may e.g. be computing devices, such as laptop computers, desktop computers, tablet computers, and/or smartphones; as well as telephones, such as mobile telephones, cordless telephones, desktop handsets, etc. The conference server 110 comprises a central conference controller 111 configured to combine the plurality of upstream audio signals 123 to form an audio conference. The central conference controller 111 may be configured to mix the plurality of upstream audio signals 123. Furthermore, the central conference controller 111 may be configured to place the plurality of upstream audio signals 123 at particular locations within a 2D or 3D conference scene (e.g. using binauralization techniques) and generate information regarding the arrangement (i.e. the locations) of the plurality of upstream audio signals 123 within the conference scene.

Furthermore, the conference server 110 may comprise a plurality of audio servers 112 for the plurality of terminals 120, respectively. It should be noted that the plurality of audio servers 112 may be provided within a single computing device/digital signal processor. The plurality of audio servers 112 may e.g. be dedicated processing modules within the server or dedicated software threads to service the audio signals for the respective plurality of terminals 120. Hence, the audio servers 112 may be "logical" entities which process the audio signals in accordance to the needs of the respective terminals 120. An audio server 112 (or an equivalent processing module or thread within a combined server) receives some or all of the plurality of upstream audio signals 123 (e.g. in the form of audio streams), and optionally the information regarding the arrangement of the plurality of upstream audio signals 123 within the conference scene. The information regarding the arrangement of the plurality of upstream audio signals 123 within the conference scene is typically provided by the conference controller 111 which thereby informs the audio server 112 (or processing module/thread) on how to process the audio signals. Using this information, the audio server 112 generates a set of downstream audio signals 124, as well as corresponding metadata, which is transmitted to the respective terminal 120, in order to enable the respective terminal 120 to render the audio signals of the participating parties in accordance to the conference scene established within the conference controller 111. The set of downstream audio signals 124 is typically transmitted as a set of downstream audio streams, e.g. bitstreams. By way of example, the set of downstream audio signals 124 may be encoded as G.711, G722.2 (AMR-WB), MPEG2 or MPEG 4 or proprietary audio bitstreams. The information regarding the placement of the downstream audio signals 124 within the conference scene may be encoded as metadata e.g. within the set of downstream audio streams. Hence, the conference server 110 (in particular the audio server 112) may be configured to encode the set of downstream audio signals 124 into a set of downstream audio streams comprising metadata for rendering the conference scene at the terminal 120.

FIG. 1a illustrates a conference system 110 with a centralized architecture. Voice conference (e.g. using 2D or 3D audio conference scenes) may also be provided using a distributed architecture, as illustrated by the conference system 150 of FIG. 1b. In the illustrated example, the terminals 170 comprise a local conference controller 175 configured to mix the audio signals of the conference participants and/or to place the audio signals into a conference scene. In a similar manner to the central conference controller 111 of the centralized conference server 110, the local conference controller 175 may be limited to analyzing the signaling information of the received audio signals in order to generate a conference scene. The actual manipulation of the audio signals may be performed by a separate audio processing unit 171.

Figure 1B:
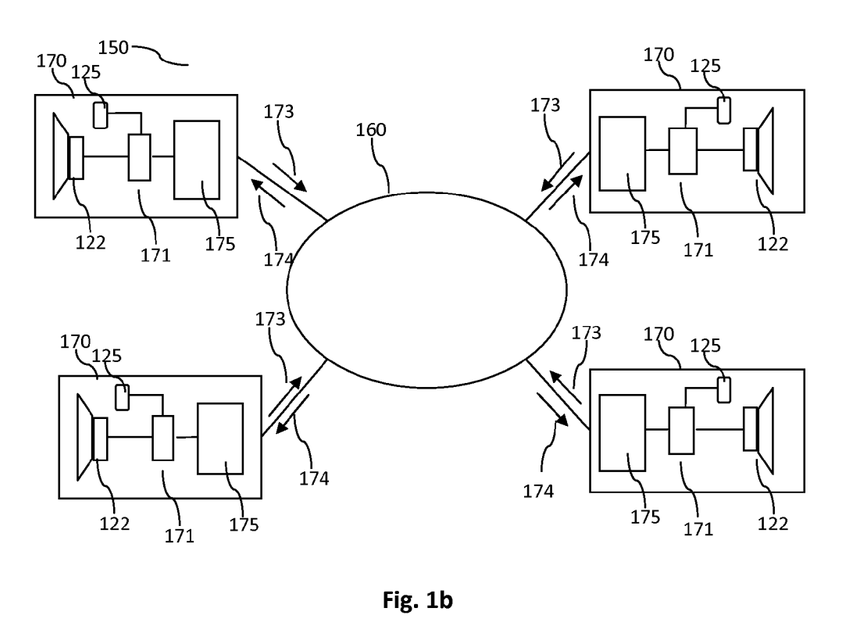
FIG. 1b shows a block diagram of an example distributed audio conference system.

A terminal 120, 170 receives a set of downstream audio signals 124 (and the corresponding metadata) and renders the set of downstream audio signals 124 via the audio transceiver 122 (e.g. headphones or loudspeakers). For this purpose, the terminal 120 (e.g. an audio processing unit 121 comprised within the terminal 120) may be configured to decode a set of downstream audio bitstreams, in order to extract the downstream audio signals and the corresponding metadata. Furthermore, the audio processing unit 121 may be configured to generate a mixed binaural audio signal for rendering by the audio transceiver 122, wherein the mixed binaural audio signal reflects the terminal specific conference scene designed at the conference server 110 for this terminal 120. In other words, the audio processing unit 121 may be configured to analyze the received metadata and to place the received set of downstream audio signals 124 into the terminal specific conference scene. As a result, the conference participant may perceive a binaural audio signal which gives the conference participant at the terminal 120 the impression that the other participants are placed at specific locations within a conference scene.

In a distributed architecture, a terminal 170 is configured to send its upstream audio signal 173 (e.g. as a bitstream) to the other participating terminals 170 via a communication network 160. For this purpose, the terminal 170 may use multicasting schemes and/or direct addressing schemes of the other participating terminals 170. Hence, in case of M participating terminals 170, each terminal 170 receives up to (M−1) downstream audio signals 174 (e.g. as bitstreams) which correspond to the upstream audio signals 173 of the (M−1) other terminals 170. The local conference controller 175 of a receiving terminal 170 may be configured to place the received downstream audio signals 174 into a 2D or 3D conference scene, wherein the receiving terminal 170 is typically placed in the center of the conference scene. The audio processing unit 171 of the receiving terminal 170 may be configured to generate a mixed binaural signal from the received downstream audio signals 174, wherein the mixed binaural signal reflects the 2D or 3D conference scene designed by the local conference controller 175. The mixed binaural signal may then be rendered by the audio transceiver 122.

Figure 2:
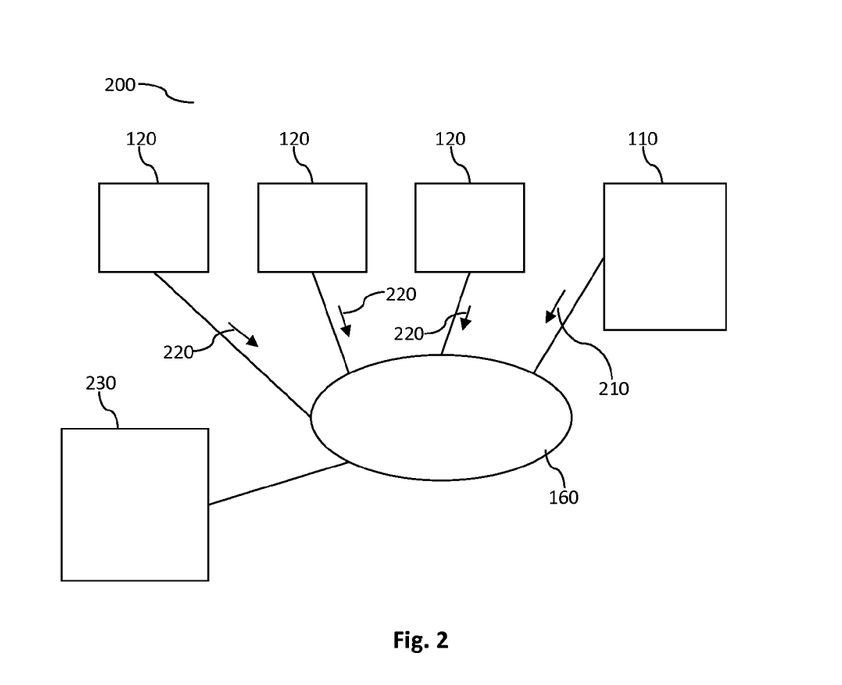
FIG. 2 shows a block diagram of an example system for measuring the commencement time instant of an audio conference.

The present document relates to the determination of an estimate of the commencement time instant of an audio conference using a conference system 100, 150 as illustrated in FIGS. 1*a* and 1*b*. FIG. 2 illustrates an example system 200 for estimating the conference commencement time instant. The system 200 may be applicable to centralized and/or de-centralized conference architectures as illustrated in FIGS. 1*a* and 1*b*. The system 200 comprises an analysis server 230 configured to receive logging data 220 from a plurality of terminals 120 (also referred to as endpoints 120) of a voice conference. Furthermore, the analysis server 230 may be configured to receive logging data 210 from a central conference server 110 (in case of a centralized conference architecture). The logging data 210, 220 may be transmitted via a communication network 160. It should be noted that in a centralized architecture, the analysis server 230 may be co-located and/or comprised within the conference server 110.

The logging data 220 of an endpoint 120 may comprise e.g.
  an identifier for a particular audio conference;
  the upstream audio signal 123, 173 generated by the endpoint 120 during the particular audio conference;
  meta data extracted from the upstream audio signal and any associated processing of the captured audio, such as voice activity times, signal level, noise conditions and activity;
  control information entered by a user of the endpoint 120 during the particular audio conference. Examples for control information are: muting of the microphone 125; volume control of the loudspeaker 122; entering of the particular audio conference; leaving of the particular audio conference; resetting of the endpoint 120.
  audio signals recorded by the microphone 125 of the endpoint 120, while the endpoint 120 was on mute;
  time stamps for the above mentioned data.

The logging data 210 provided by the conference server 110 may comprise e.g.
  an identifier for the particular audio conference;
  a scheduled start time for the particular audio conference;
  information regarding the chairperson of the particular audio conference (e.g. an identifier of the endpoint 120 of the chairperson of the particular audio conference);
  waiting times for one or more endpoints 120 prior to the chairperson opening the particular audio conference;
  information regarding the Joining/Leaving of individual endpoints 120 to and from the particular audio conference;
  time stamps for the above mentioned data.

The received logging data 220 from the endpoints 120 and/or the received logging data 210 from the conference server 110 may be analyzed by the analysis server 230, in order to determine one or more events that have occurred at the respective endpoints 120 during the particular audio conference. The one or more events may be selected from a pre-determined list of events. The pre-determined list of events may comprise e.g.
  a Joining event (indicated as "J" in the present document): The Joining event may indicate that the endpoint 120 has entered the particular audio conference. The particular audio conference may be considered to be joined, even though the chairperson has not opened the conference. The Joining event may be detected based on the control information from an endpoint 120 and/or based on Leaving/Joining information from the conference server 110.
  Leaving event (indicated as "L" in the present document): The Leaving event may indicate that the endpoint 120 has left the particular audio conference. The Leaving event may be detected based on the control information from an endpoint 120 and/or based on Leaving/Joining information from the conference server 110.
  a Start Talking event (indicated as "S" in the present document): The Start Talking event may indicate that a user at the endpoint 120 has started to provide a spoken contribution to the particular audio conference. The "S" event may be determined based on the upstream audio signals 123, 173 from the respective endpoint 120. By way of example, the "S" event may be detected by determining that the upstream audio signal 123, 173 from the respective endpoint 120 comprises a speech signal having an energy above a pre-determined first energy threshold.
  a Finish Talking event (indicated as "F" in the present document): The "F" event may indicate that a user at the endpoint 120 has stopped making a spoken contribution to the particular audio conference. The "F" event may be determined based on the upstream audio signal 123, 173. By way of example, the "F" event may be detected by determining that the upstream audio signal 123, 173 comprises an energy below a pre-determined second energy threshold. For stability reasons, the second energy threshold is typically lower than the first energy threshold.
  Alternatively or in addition to an "S" event and an "F" event, a Talking event (indicated as "T" in the present document) may be identified. The "T" event may start with an "S" event and may remain active until an "F" event is detected.
  A Mute event (indicated as "M" in the present document): The "M" event may indicate that the user at the endpoint 120 has put the endpoint 120 into the "mute" mode. The "M" event may be detected based on control information from the endpoint 120.

Figure 3A:
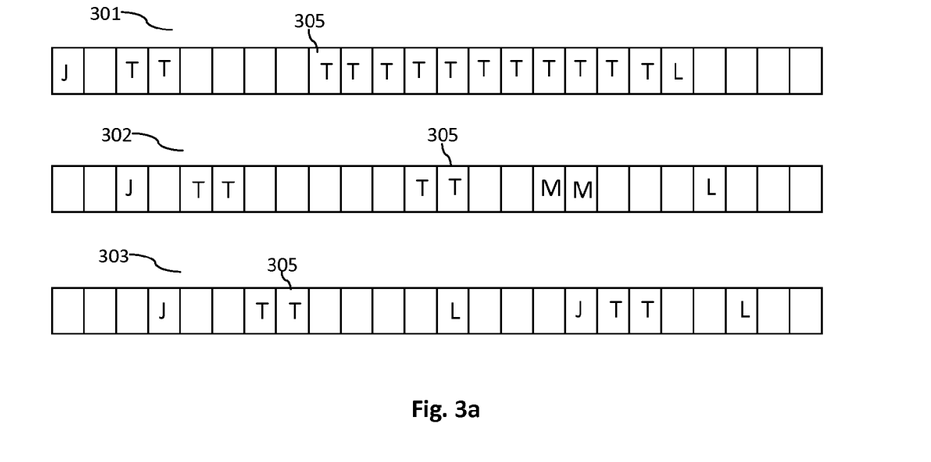
FIGS. 3a to 3f illustrate various aspects of an example scheme for determining the commencement time instant of an audio conference.

As a result of the analysis of the logging data 210, 220, a sequence of events is provided for each endpoint 120 participating in the particular audio conference. Using the time stamp information provided in the logging data 210, 220, the events within the sequence of events are associated with respective time stamps which may be used to align the plurality of sequences of events for a corresponding plurality of endpoints 120. FIG. 3*a* illustrates example sequences 301, 302, 303 of events for three different endpoints 120 of an audio conference. It can be seen that the sequences 301, 302, 303 comprise various events 305 at various different time instants.

It should be noted that an endpoint 120 may be configured to perform the analysis of the data available at the endpoint 120 and provide a sequence of events to the analysis server 230. As such, the logging data 220 received from an endpoint 120 may comprise a sequence 301 of events 305. In another embodiment, the conference server 110 may be configured to determine a sequence of events for each endpoint 120 based on the data available at the conference server 110.

The above mentioned detection of events at an endpoint 120 based on the data logged for the respective endpoint 120 may be considered to be part of a first stage of data reduction. In addition to breaking up the data logged for an endpoint 120 into simple events like Join, Leave, Start talking, Finish talking, Interrupt, Mute, etc., i.e. in addition to a simplification of the logged data, the first stage of data reduction typically comprises alignment and consistency validation. As part of the consistency validation it may be determined whether the logs for different endpoints 120 are part of the same audio conference. This consistency validation may be performed based on the conference identifiers comprised within the logging data 210, 220. Furthermore, it may be verified that the time stamps of the logging data are aligned and that patterns of activity line up (e.g. in case there are time stamp errors). In other words, it is ensured that the sequences 301, 302, 303 of events for the different endpoints 120 belong to the same audio conference and/or are time aligned.

Figure 3B:
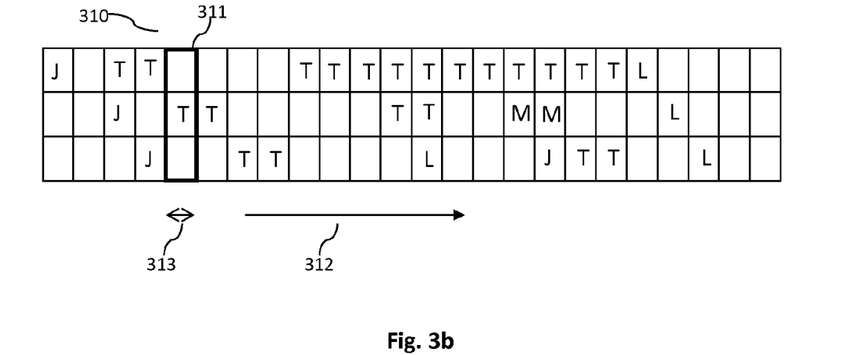

As a result of the above mentioned first stage of data reduction, a sequence 310 of event vectors 311 is obtained, wherein the dimension M of the event vectors may correspond to the number M of endpoints 120 participating in the audio conference. FIG. 3b shows an example sequence 310 of event vectors 311 for the sequences 301, 302, 303 of events 305 illustrated in FIG. 3a. It can be seen that the audio conference can be described by the sequence 310 of event vectors 311. Each event vector 311 describes a time interval 313 of the audio conference. The length of the time interval 313 depends on the event sampling rate $f_e$. By way of example, the event sampling rate $f_e$ may be 1 Hz and in some cases with efficient event logging it may be as high as the audio frame rate typically at or around 50 Hz. As such, the sequence 310 of event vectors 311 describes selected events that occurred in the audio conference along the time line 312.

Figure 3C:
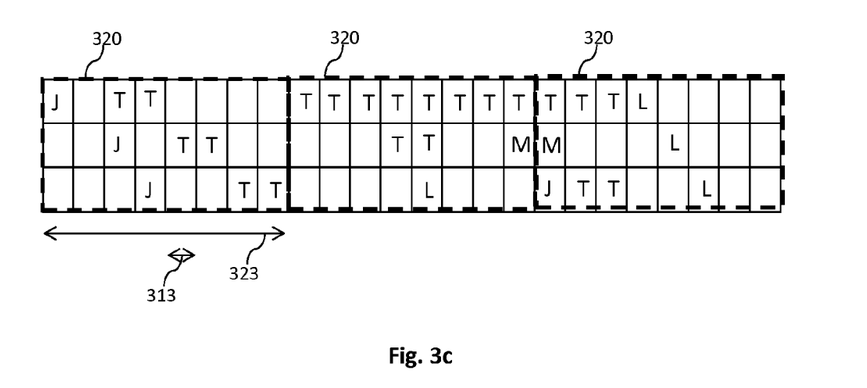

A further (second) stage of data reduction may be the extraction of features from the sequence 310 of event vectors 311 describing the audio conference. Feature extraction typically involves determining a set of aggregate statistics based on the sequence 310 of event vectors 311. For this purpose, sequential blocks 320 of event vectors 311 are analyzed to determine a set of meaningful features. FIG. 3c shows a sequence of blocks 320 of event vectors 311. A block 320 of event vectors 311 typically comprises a plurality of adjacent event vectors 311, thereby covering a block length 323 of the audio conference. As a result, a sequence of blocks 320 of event vectors 311 is obtained. A block 320 of event vectors 311 may be used to determine a set of conference features. By determining the set of conference features for the sequence of blocks 320, a sequence of sets of conference features may be obtained.

Figure 3D:
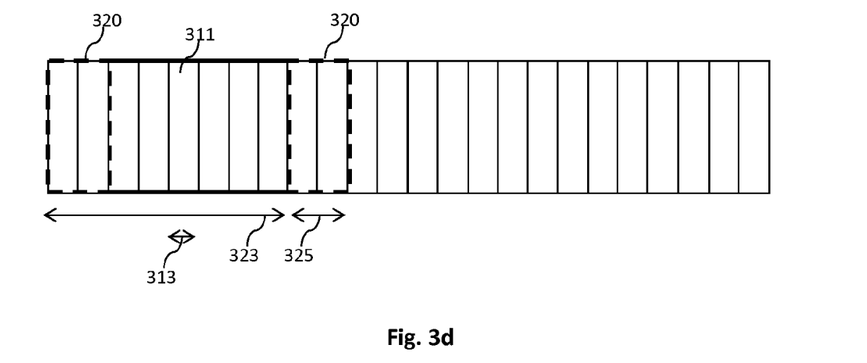

In order to increase the time resolution of the sequence of sets of conference features, adjacent blocks 320 of event vectors 311 may overlap, i.e. the end of a first block 320 may comprise a certain number of the same event vectors 311 as the beginning of a directly succeeding second block 320. This is illustrated in FIG. 3d. It can be seen that two succeeding blocks 320 comprise one or more of the same event vectors 311. The time interval 325 between two succeeding blocks 320 is reduced compared to the example of FIG. 3c where the time interval 323 between two succeeding blocks 320 corresponds to the block length 323. As a result, the time resolution of the sequence of sets of conference features may be increased, thereby increasing the time resolution of the estimate for the commencement time of the audio conference. By way of example, the block length 323 may be 1 to 5 minutes and/or the time interval 325 between two succeeding block 320 may be 30 seconds to 1 minute.

Example features which may be determined based on a block 320 of event vectors 311 may be the relative talking time (e.g. given in % of time) of the different endpoints 120 within the time interval 323 of the audio conference corresponding to the analyzed block 320. This feature may be referred to as the RTT (Relative Talking Time) feature. The RTT feature may indicate the relative talking time (given in % of time) of the N most active endpoints 120 among the M endpoints 120 of the audio conference, N smaller or equal to M (e.g. N=3). The RTT feature may be determined by determining for each endpoint 120 the cumulated length of the T events compared to the block length 323. In other words, in order to determine the RTT feature the ratio of each of the top N participants to the total voice time may be listed, starting from the time that there is voice activity. The RTT feature is a measure of the churn or balance of a meeting. The RTT feature typically shifts from one participant to another participant over time periods in the range of minutes.

the relative time that a pre-determined number of talkers (i.e. endpoints 120) are concurrently active. This feature may be referred to as the CTT (Concurrent Talker Time) feature. The CTT feature may be a vector of K dimensions, wherein each dimension indicates a different number of concurrent talkers (0, 1, 2, ..., K−1), K being smaller or equal to M. The value of a dimension of the CTT feature vector, which corresponds to k (k=0, ..., K−1) concurrently active talkers, may indicate the percentage of time of the block length 323 that k talkers have been concurrently active. The CTT feature may be determined based on the T events 305 comprised within the block 320 of event vectors 311. In other words, in order to determine the CTT feature, the number of simultaneous active speakers may be aggregated for values of e.g. 0 through to 4 simultaneous active speakers. The CTT feature indicates the overall voice duty cycle and simultaneous endpoints 120. Example distributions of the CCT feature can be given for disparate and coordinated activity at the endpoints 120.

the number of turns or hand overs between different talkers (i.e. different endpoints 120) that occurred within a block 320. This feature may be referred to as the NT (Number of Turns) feature. The NT feature may indicate the number of transitions of T events between different endpoints 120. In order to determine the number of endpoint transitions, at the beginning of a block 320 a first endpoint 120 having a T event may be assigned to be the primary talker. A transition to a new primary talker may occur as when the T events of the current primary talker stop and a different endpoint 120 with a T event can be identified. By repeating such an analysis for the entire block length 323, the NT feature can be determined as the total number of talker transitions. Typically, a relatively low value of the NT feature indicates a stable start of the (productive) audio conference.

the total number L of endpoints 120 which comprise a continuous T event of more than a minimum length of time $T_{min}$, L being smaller than or equal to M. As indicated above, a T event may be detected if the energy of the upstream audio signals 123, 173 of an endpoint 120 exceeds a pre-determined first energy threshold (of e.g. −30 dB). The minimum length of time $T_{min}$ may e.g. be 2 seconds. This feature may be referred to as the NAE (Number of Active Endpoints) feature. The NAE feature may indicate introductions or attendance checks when the NAE feature approaches the size M of the audio conference.

the number of distinct T events and their respective length.

Some or all of the above mentioned features (as well as other features) may be combined to form a set of features (also referred to as a feature vector). Data over segments (e.g. over blocks 320) ranging from 1-5 minutes may be aggregated for this purpose. As shown in FIG. 3d the advance 325 between feature samples may be less than the time window length 323 and may e.g. be 1 minute. This allows for a 1 minute resolution in order to estimate the commencement time, while at the same time providing a sufficiently long time window 323 for determining the features.

Figure 3E:
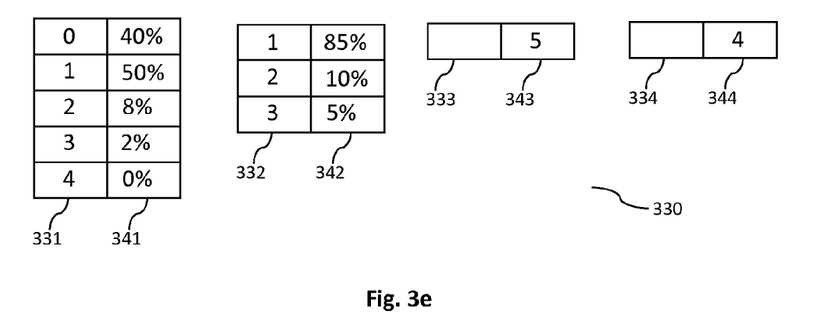

FIG. 3e illustrates an example set 330 of features 331, 332, 333, 334 determined based on a block 320 of event vectors 311. As indicated above, the set 330 of features may also be referred to as a feature vector 330. In the illustrated example, the set 330 of features comprises the CTT feature 331, the RTT feature 332, the NT feature 333 and the NAE feature 334. The number M of endpoints 120 in the example audio conference is M=4. In addition to the features 331, 332, 333, 334, the respective feature values 341, 342, 343, 344 are shown. Based on the sequence of blocks 320 of event vectors 311, a sequence of sets 330 of features may be determined. A set 330 of features describes the structure of an audio conference within the time interval 323 of the corresponding block 320. As such, the sequence of sets 330 of features describes the evolution of the structure of the audio conference along the time line 312. In other words, the set 330 of features provides a pattern representing the audio conference within the time interval 323, and the sequence of sets 330 of features provides an evolution of patterns representing the audio conference along the time line 312. Hence, pattern recognition techniques may be used to automatically identify a status of the audio conference (e.g. the commencement of a productive audio conference) based on the sequence of sets 330 of features. In particular, a machine learning classifier may be used for such purposes.

In summary, a further stage of data reduction is the extraction of feature vectors 330 from the blocks 320 of event vectors 311. For this purpose, the data is reduced to a set of useful aggregated statistics (i.e. features 331, 332, 333, 334) that were discovered by the inventors to have useful discriminating power with regards to the state of a conference. A machine learning classifier, given these feature vectors 330 and trained against manually annotated data, is able to provide a momentary classification of the audio conference. Suitable machine learning techniques may comprise the use of support vector machines, boosting, Gaussian Mixture Models and/or Hidden Markov Models. In other words, using a machine learning classifier the feature vector 330 describing the audio conference at a particular point of time may be mapped to one of a plurality of pre-determined classifications of the audio conference. Using the sequence of feature vectors 330, a sequence of classifications for the audio conference may be provided, thereby attributing the audio conference to different classifications along the time line 312.

Example classifications may be
    a W classification, indicating that the participants of the audio conference are waiting for something;
    a B classification, indicating banter and/or uncoordinated activity within the audio conference;
    an I classification, indicating introductions and attendance check within the audio conference;
    a C classification, indicating productive conference activity;
    a S (sign off) classification, indicating an end phase of the audio conference.

Figure 3F:
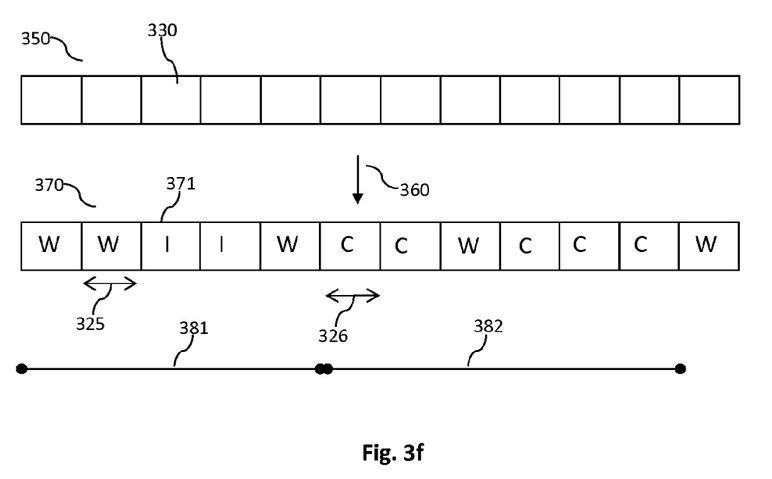

In other words, using annotated training data, a machine learning classifier may be provided that is configured to assign a feature vector 330 to one of a plurality of pre-determined classifications. As a result, a sequence 350 of feature vectors 330 may be assigned to a sequence 370 of classifications 371 as shown in FIG. 3f. It can be seen that using a classifier 360, each feature vector 330 may be assigned to a classification 371.

The output from the classifier 360, i.e. the sequence 370 of classifications 371 may be passed through a segmentation algorithm. The segmentation algorithm may be designed to look for a transition, e.g. to a period where the distribution of C classifications starts to exceeds the other types of classifications, thereby indicating the main body of the conference. The segmentation algorithm may make use of one or more segmentation rules such as the rules listed in Table 1.

A sequence 370 of classifications 371 may be considered to be an observation or estimated property of an audio conference, that is related to an underlying state. An example two state model may be used to represent the long term underlying segment of a productive conference, or peripheral activity. From observing labeled data sets, the transition probabilities for such a Markov model can be determined between such segments. In addition to this, a model of the probability distribution of immediate classifier labels for the two underlying segment types can be determined. In particular, the probability of observing a C will typically be substantially higher in the case of the underlying segment being part of the main conference activity. This framework may be used in the context of Hidden Markov Models (HMM) to identify the most likely point of transition between these segments. The latter approach which makes use of a machine learned classifier (e.g. based on a HMM) to determine a transition point between two segments may provide a more accurate estimation of the specific transition point between two segments than the approach described above.

By using an optimal estimation technique such as a HMM with a model derived from labeled conference data sets, it is possible to look at a reduced detail representation of a conference in terms of the transition in and out of the operational conference state. Where a conference has the typical structure of one central segment of structured participation, the commencement point may be determined within a first reasonable fraction of the audio conference, which may be between 5 and 30%, of the total conference length. Furthermore, the structured activity may represent a majority of the conference length. In such situations, it may be taken as a reliable data point whereby the first transition is indicative of an underlying meeting commencement. Where meeting patterns are observed such as an absence of any real transition or repeated and sporadic transitions between the underlying segment classes, then such a meeting may be considered abnormal or not appropriately classified and thus assigned a lower level of confidence. In some cases, the level of confidence may be assigned a value representing the change in the probability of observing a C classification output of the classifier between the first segment 381 and the second segment 382. A relatively high value (e.g. a maximum value or a value of 1) may represent a detected sequence 382 that shows an onset of C classifications that is then continuous through a period of the audio conference, suggesting a high likelihood of a clearly identifiable conference commencement.

A final stage of processing may combine the identified segment times, additional information from a set of rules about party dominance and join times, and other structured inference to arrive at an estimate of commencement time, an estimate of the cause of the delay (e.g. from Table 1 regarding modes of delay), and a confidence level regarding the estimate of the commencement time.

In particular, the rules may require that the meeting commencement time is noted as occurring after the joining time of any significant participant. Specifically, the conference may transition to a segment more prevalent with C classifications at some earlier point, and then a participant joining the conference at a later time is aligned with another identified segment transition. If that late participant is also a frequently active participant, and no further transitions are identified, then the later transition to a structured conference may be taken as the underlying commencement time. In contrast, a participant joining the conference late and not significantly participating would not shift the estimated commencement time from a clear earlier transition. Hence, pre-determined rules may be taken into account when determining an estimate of the commencement time instant.

In other words, a segmentation algorithm may be used to detect one or more segments 382 within the sequence 370 of classifications 371 with an increased density of C classifications. The first transition between a segment 381 with a relative low density of C classifications to a segment 382 with relatively high density of C classifications may be taken as an estimate 326 for the commencement time instant of the audio conference. This is illustrated in FIG. 3f. It can be seen that starting from the time period 326 onwards, a relatively high density of C classifications occurs. Hence, it may be concluded that the audio conference started to be productive within the time period 326. As such, the time period 326 (e.g. the beginning of the time period 326) may be taken as an estimate for the commencement time instant of the audio conference. As outlined above, such estimate of the commencement time instant can only be determined with a time resolution which corresponds to the time interval 325 between adjacent blocks 320 of event vectors 311 (i.e. to the time interval 325 between adjacent feature vectors 330).

The segments 381, 382 may be analyzed further (e.g. using a pre-determined set of rules as e.g. those listed in Table 1) in order to determine a confidence level of the estimate 326 of the commencement time instant and/or in order to determine an estimate of the reason for the delayed commencement of the audio conference.

Figure 4:
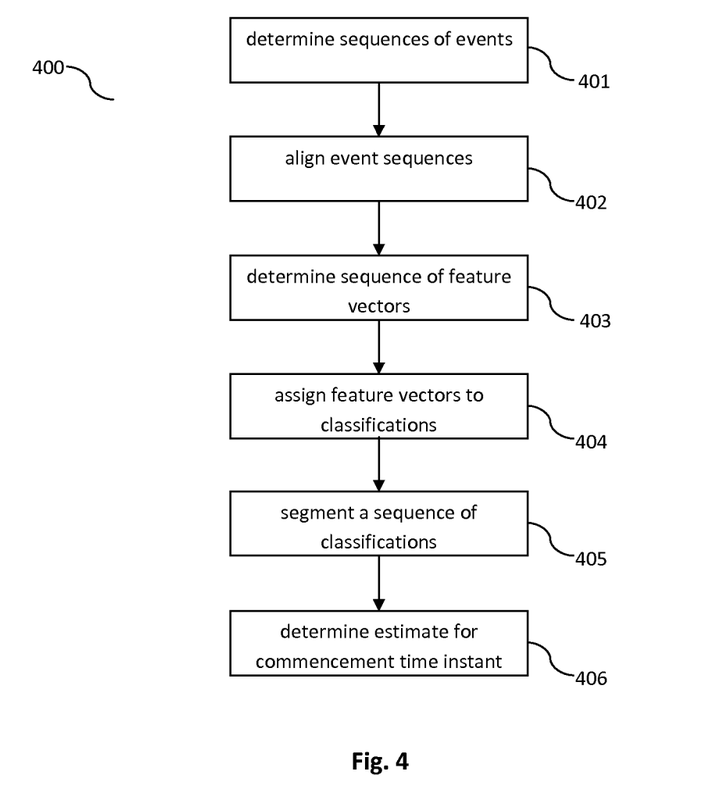
FIG. 4 shows a flow chart of an example method for determining the commencement time instant of an audio conference.

FIG. 4 illustrates an example method 400 for determining an estimate of the commencement time instant of an audio conference. In step 401 sequences 301, 302, 303 of events 305 are determined for a plurality of endpoints 120 of an audio conference. The sequences 301, 302, 303 of events 305 are time aligned and combined in order to form a sequence 310 of event vectors 311 (step 402). In step 403, feature vectors 330 are determined based on (possibly overlapping) blocks of succeeding event vectors 311 from the sequence 310 of event vectors 311. The feature vectors 330 may be determined based on statistical analysis of the event vectors 311 comprised within the underlying block 320 of the feature vector 330. In step 404 a classifier 360 is used to assign the resulting sequence 350 of feature vectors 330 to a corresponding sequence 370 of classifications 371 taken from a pre-determined list of classifications. The pre-determined list of classifications comprises a so called C classification indicative of a productive audio conference.

The classifier 360 may have been determined based on manually annotated training data taken from a plurality of audio conferences. The annotated training data may comprise sequences 350 of feature vectors 330 and manually assigned sequences 370 of classifications 371. As such, the annotated training data allows for the determination of a clustering algorithm comprising clusters of feature vectors 330 around the possible classifications 371 of the pre-determined set of classifications. As a result a clustering algorithm may be determined based on the annotated training data, wherein the classifier 360 makes use of the clustering algorithm to perform the above mentioned assignment task.

In step 405, the sequence 370 of classifications 371 is segmented into one or more segments 381 comprising a relatively low density of C classifications and one or more segments 382 comprising a relatively high density of C classifications. For this purpose, a density threshold may be used, wherein a segment 382 is considered to comprise a relatively high density of C classifications, if the density of C classifications exceeds the pre-determined density thresholds. An estimate of the commencement time instant of the audio conference may be determined (step 406) based on a transition from a segment 381 comprising a relatively low density of C classifications and a segment 382 comprising a relatively high density of C classifications (e.g. based on the first transition). The length of the segments may be fixed to a pre-determined number of adjacent feature vectors 330.

As indicated above, by using a pre-determined set of rules (e.g. those listed in Table 1), a cause for the estimated commencement time instant 326 may determined. In this way, the analysis may dive further into the logged data 210, 220 to isolate the cause due to the participating people (e.g. late or absent) or due to the technology system (e.g. connection problems).

A particular cause for a delay (i.e. for an estimated commencement time instant 326 which lies significantly after the scheduled or actual start of the audio conference) may be a new system user or a faulty endpoint 120. To identify and potentially remedy this cause, a number of times that an individual endpoint 120 or user is responsible for a delay in commencement (e.g. due to late arrival or due to connection problems) may be tracked.

As already indicated above, the data capture (i.e. the logging of data 210, 220), the analytic implementation and visualization may be provided by a third party or may be provided in a Management Information System (MIS) using an analysis server 230. MIS systems typically have extensive capability for storage, reference and archive and are equipped with toolbox analytics and presentation graphics that could realize the algorithms detailed in the present document. The combination of the analysis algorithm and data analysis is envisaged to provide a powerful high level analysis and fault finding tool.

Figure 5A:
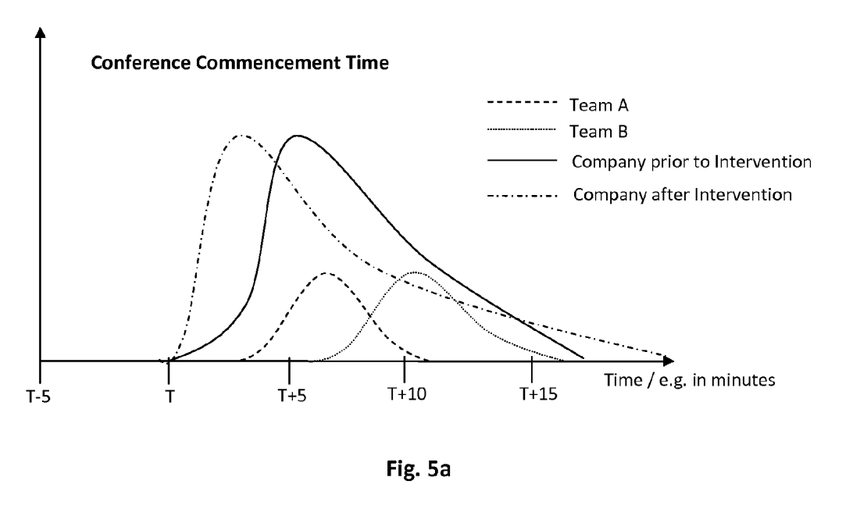
FIGS. 5a and 5b illustrate example analysis graphs of commencement time data.
Figure 5B:
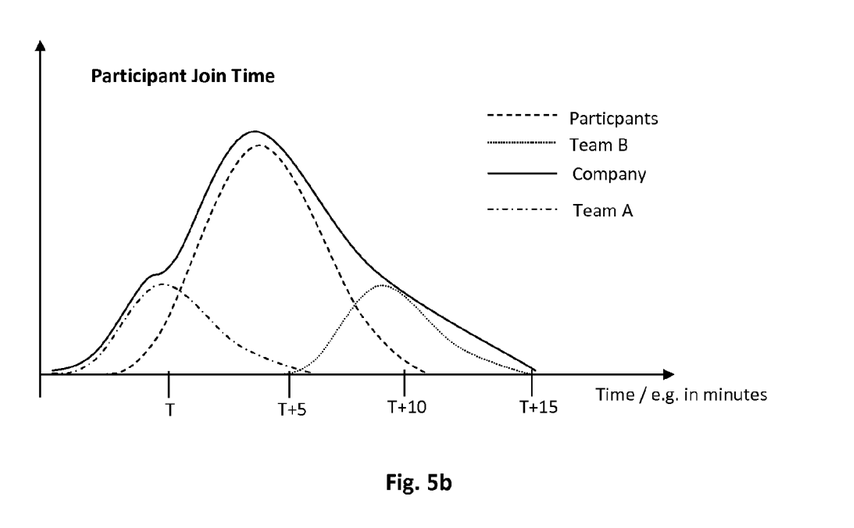

By way of example, historical plots of time to commence, time for parties to join, and time for individuals to join audio conferences may be analyzed. The respective time instants may be provided relative to the first party joining, relative to the scheduled appointment and/or relative to some quantized time schema (typically a 15 minutes or 30 minutes schema). FIG. 5a shows example plots of historical data of e.g. the commencement time instant 326 relative to the scheduled start time of the audio conference. Given such kind of information and a Management Information System (MIS), a means of identifying efficiency in virtual conferencing, and of tracking the effect and improvements resultant in specific policy, training, group norms and directives can be provided.

The measures of commencement time and individual participant joining times, when looked at across time and across specific groups, may be used as an indication of efficiency around meetings. The availability of such indications may eventually lead to an effective management of such meetings. Furthermore, the measures of commencement time and individual participant joining times may allow a comparison of different conference system media and settings. In an example, the conference commencement time is displayed for a set of different conference endpoint compositions. For example, meetings where most participants are on binaural or spatial endpoints could be compared to meetings where most participants are on legacy VoIP or PSTN endpoints. As a result, the benefits of binaural endpoints with regards to meeting efficiency compared to conventional endpoints may be identified.

It is proposed in the present document to include logged data 210, 220 such as end point participation, departure time, over extension (channel left open past the conference end), and uncharacteristic local speech activity, whilst in muted listening mode as a further means of creating a reliable metric of prompt attendance and attention. The methods described in the present document may be used to run analytics based e.g. on the following metrics: The attendance record of participants related to the meeting commencement time; the frequency of joins/disconnects per participant per conference; the percentage of joined participants vs. expected participants; the total time for conference "introduction" phase vs. "content" phase—commencement ratio; the percentage of participants during the "content" phase; and/or the analysis against the number and types of endpoints in any conference.

In the present document, methods and systems for automatically determining an estimate of the actual commencement time instant of an audio conference have been described. The methods and systems make use of various data reduction schemes to provide a reliable and robust estimate. In particular, the determination of pre-determined events from logged audio conferencing data, the determination of pre-determined feature vectors based on the determined events and/or the use of a machine learning classifier ensure the reliable determination of an estimate for the commencement time instant.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

What is claimed is:

1. A method for determining that an audio conference which makes use of an audio conference system is in a first phase of a plurality of pre-determined phases; wherein the audio conference system links a plurality of M terminals, M>2 for participants of the audio conference; the method comprising determining a plurality of sequences of events for the plurality of terminals of the audio conference system, respectively; wherein an event from the sequences of events indicates that a talker activity at a terminal has been detected within an event time interval;

determining a sequence of feature vectors based on the plurality of sequences of events;
wherein a feature vector of the sequence of feature vectors is indicative of the talker activity at one or more of the plurality of terminals relative to the talker activity at all of the plurality of terminals within a feature time interval,
wherein a feature vector of the sequence of feature vectors is indicative of a concurrent talker activity at one or more of the plurality of terminals, respectively, within the feature time interval, and/or
wherein a feature vector of the sequence of feature vectors is indicative of a number of hand overs of talker activity between different terminals within the feature time interval;
wherein the feature time interval comprises a plurality of event time intervals; and
determining that the audio conference is in the first phase based on the sequence of feature vectors.

2. The method of claim 1, wherein detecting the talker activity within the event time interval comprises
determining an energy of an upstream audio signal generated by the terminal within the event time interval; and
determining that the energy within the event time interval is greater than a pre-determined first energy threshold.

3. The method of claim 1, wherein determining a sequence of events for a terminal comprises analyzing logging data logged at or logged for the terminal during the audio conference; wherein the logging data comprises any one or more of:
an identifier for the audio conference;
an upstream audio signal generated by the terminal during the audio conference using a microphone;
terminal control information generated at the terminal during the audio conference; and
time stamp data allowing to align the logging data received from a plurality of terminals.

4. The method of claim 1, wherein the events from the plurality of sequences of events are selected from any one or more of:
the event indicative of the talker activity at a respective terminal within the event time interval, referred to as a T event;
an M event indicative of a respective terminal being in mute within the event time interval;
a J event indicative of a respective terminal dialing into the audio conference within the event time interval; and
an L event indicative of a respective terminal terminating the audio conference within the event time interval.

5. The method of claim 1, wherein the concurrent talker activity of k terminals, k=0, . . . , K, is determined based on a number of event time intervals within the feature time interval for which k terminals have concurrent T events.

6. The method of claim 1, wherein the feature vector of the sequence of feature vectors is indicative of a number L of different terminals comprising at least one T event within the feature time interval.

7. The method of claim 1, wherein determining a sequence of feature vectors comprises
selecting a first feature time interval for determining a first feature vector of the sequence of feature vectors; and
selecting a second feature time interval for determining a second feature vector of the sequence of feature vectors;
wherein the second feature vector directly succeeds the first feature vector in the sequence of feature vectors;
wherein the first and second time intervals overlap.

8. The method of claim 1 further comprising time aligning the plurality of sequences of events for the plurality of terminals.

9. The method of claim 1 further comprising assigning a feature vector of the sequence of feature vectors to one of a plurality of pre-determined classifications; wherein a classification of the plurality of classifications is indicative of a corresponding type of activity within the audio conference.

10. The method of claim 9, wherein the plurality of pre-determined classifications comprises any one or more of:
   a W classification, indicative of a waiting phase of the audio conference;
   a B classification, indicative of phase of uncoordinated activity within the audio conference;
   an I classification, indicative of a phase of participant introductions and attendance check within the audio conference;
   a C classification, indicative of a phase of productive activity within the audio conference; and
   an S classification, indicative of a sign off phase of the audio conference.

11. The method of claim 10, further comprising
   determining a sequence of classifications from the sequence of feature vectors; and
   identifying a segment within the sequence of classifications having a density of C classifications higher than a density threshold; wherein the segment comprises a pre-determined number of succeeding classifications from the sequence of classifications.

12. The method of claim 11, wherein the method further comprises determining an estimate of a commencement time instant of the audio conference based on the identified segment; wherein the commencement time instant is indicative of a beginning of a cooperative phase of the audio conference.

13. The method of claim 12, wherein the commencement time instant is indicative of a transition from an introductory phase to the cooperative phase of the audio conference.

14. The method of claim 11, wherein
   the audio conference system comprises a 2D or 3D conference scene;
   the terminals are placed at different talker locations within the 2D or 3D conference scene; and
   the method further comprises selecting the different talker locations based on the estimate of the commencement time instant.

15. The method of claim 11, wherein the estimate of the commencement time instant is indicated relative to
   a scheduled start time of the audio conference;
   a time instant indicative of one of the plurality of terminals joining the audio conference; and/or
   a regional time corresponding to a full hour, a quarter to the full hour, half past the full hour or a quarter to the full hour.

16. The method of claim 1, wherein the plurality of phases of the audio conference comprises any one or more of
   a waiting phase of the audio conference;
   a phase of uncoordinated activity within the audio conference;
   a phase of participant introductions and attendance check within the audio conference;
   a phase of productive activity within the audio conference;
   a cooperative phase of the audio conference;
   an introductory phase of the audio conference; and
   a sign off phase of the audio conference.

17. The method of claim 16, wherein
   the cooperative phase extends across a plurality of feature time intervals;
   the phase of productive activity extends across at least one feature time interval; and
   the cooperative phase comprises a density of phases of productive activity exceeding a density threshold.

18. The method of claim 1, wherein
   all the events of the sequences of events share a common time grid with a grid spacing corresponding to the event time interval; and
   all feature vectors of the sequence of feature vectors cover a time interval corresponding to the feature time interval.

19. An analysis server configured to estimate a commencement time instant of an audio conference which is performed within an audio conference system; wherein the audio conference system links a plurality of M terminals, M>2 for participants of the audio conference; wherein the commencement time instant is indicative of a beginning of a cooperative phase of the audio conference; wherein the analysis server is configured to
   receive logging data related to the plurality of terminals;
   determine a plurality of sequences of events for the plurality of terminals of the audio conference system, respectively, based on the logging data; wherein an event from the sequences of events indicates that a talker activity at a terminal has been detected within an event time interval;
   determine a sequence of feature vectors based on the plurality of sequences of events;
      wherein a feature vector of the sequence of feature vectors is indicative of the talker activity at at least one of the plurality of terminals relative to the talker activity at at least another one of the plurality of terminals within a feature time interval,
      wherein a feature vector of the sequence of feature vectors is indicative of a concurrent talker activity at K terminals, respectively, within the feature time interval, K>1, and/or
      wherein a feature vector of the sequence of feature vectors is indicative of a number of hand overs of talker activity between different terminals within the feature time interval;
      wherein the feature time interval comprises a plurality of event time intervals; and
   determine the estimate of the commencement time instant based on the sequence of feature vectors.

20. A storage medium comprising a software program adapted for execution on a processor and for performing the method steps of claim 1 when carried out on a computing device.

* * * * *